United States Patent [19]

Nagashima et al.

[11] Patent Number: 6,017,837

[45] Date of Patent: *Jan. 25, 2000

[54] ULTRAVIOLET AND INFRARED RADIATION ABSORBING GLASS

[75] Inventors: Yukihito Nagashima; Tadakazu Hidai, both of Osaka, Japan

[73] Assignee: Nippon Sheet Glass Co., Ltd., Osaka, Japan

[ * ] Notice: This patent is subject to a terminal disclaimer.

[21] Appl. No.: 08/657,203

[22] Filed: Jun. 3, 1996

[30] Foreign Application Priority Data

Jun. 16, 1995 [JP] Japan ..................................... 7-150675
Jun. 28, 1995 [JP] Japan ..................................... 7-162289

[51] Int. Cl.⁷ ............................ C03C 3/087; C03C 3/095
[52] U.S. Cl. .............................. 501/64; 501/70; 501/904; 501/905
[58] Field of Search .................................. 501/64, 65, 66, 501/70, 904, 905

[56] References Cited

U.S. PATENT DOCUMENTS

| | | | |
|---|---|---|---|
| 2,860,059 | 11/1958 | Molter et al. | 501/70 |
| 4,792,536 | 12/1988 | Pecoraro et al. | 501/70 |
| 5,077,133 | 12/1991 | Cheng | 501/64 |
| 5,112,778 | 5/1992 | Cheng et al. | 501/31 |
| 5,240,886 | 8/1993 | Gulotta et al. | 501/70 |
| 5,264,400 | 11/1993 | Nakaguchi et al. | 501/71 |
| 5,318,931 | 6/1994 | Nakaguchi et al. | 501/64 |
| 5,320,986 | 6/1994 | Taniguchi et al. | 501/70 |
| 5,344,798 | 9/1994 | Morimoto et al. | 501/70 |
| 5,362,689 | 11/1994 | Morimoto et al. | 501/70 |
| 5,372,977 | 12/1994 | Mazon-Ramos et al. | 501/57 |
| 5,380,685 | 1/1995 | Morimoto et al. | 501/71 |
| 5,385,872 | 1/1995 | Gulotta et al. | 501/71 |
| 5,723,390 | 3/1998 | Kijima et al. | 501/70 |
| 5,763,342 | 6/1998 | Mita et al. | 501/71 |
| 5,830,812 | 11/1998 | Shelestak et al. | 501/71 |
| 5,858,894 | 1/1999 | Nagashima et al. | 501/64 |
| 5,858,896 | 1/1999 | Nagashima et al. | 501/64 |

FOREIGN PATENT DOCUMENTS

| | | |
|---|---|---|
| 0469446 | 2/1992 | European Pat. Off. . |
| 0604314 | 12/1993 | European Pat. Off. . |
| 709 344 A1 | 10/1995 | European Pat. Off. . |
| 745 566 A1 | 5/1996 | European Pat. Off. . |
| 269 0437 | 10/1993 | France . |
| 3187946 | 8/1991 | Japan . |
| 4231347 | 8/1992 | Japan . |
| 4310539 | 11/1992 | Japan . |
| 6056466 | 3/1994 | Japan . |
| 656466 | 3/1994 | Japan . |
| 6191880 | 7/1994 | Japan . |
| 8034637 | 2/1996 | Japan . |
| WO 9107356 | 5/1991 | WIPO . |
| WO 9111402 | 8/1991 | WIPO . |

*Primary Examiner*—Karl Group
*Attorney, Agent, or Firm*—Sughrue, Mion, Zinn Macpeak & Seas, PLLC

[57] ABSTRACT

Ultraviolet and infrared radiation absorbing glass comprising, as basic glass components, 65 to 80% by weight of $SiO_2$, 0 to 5% by weight of $Al_2O_3$, 0 to 10% by weight of MgO, 5 to 15% by weight of CaO, 10 to 18% by weight of $Na_2O$, 0 to 5% by weight of $K_2O$, 5 to 15% by weight in total of MgO and CaO, 10 to 20% by weight in total of $Na_2O$ and $K_2O$, and 0 to 5% by weight of $B_2O_3$; and as coloring components, 0.75 to 0.95% by weight, in terms of $Fe_2O_3$, of total iron oxide, 1.2 to 1.4% by weight of $CeO_2$, and 0 to 0.5% by weight of $TiO_2$, and satisfying equation (I):

$$(0.2\times(CeO_2)-0.04) \leq (FeO/T-Fe_2O_3) \leq (0.2\times(CeO_2)+0.08) \quad (I)$$

wherein $(CeO_2)$ represents the amount of $CeO_2$ in terms of percent by weight, and $(FeO/T-Fe_2O_3)$ represents the weight ratio of FeO in terms of $Fe_2O_3$ to the total iron oxide in terms of $Fe_2O_3$, and ultraviolet and infrared radiation absorbing glass comprising, as basic glass components, 65 to 80% by weight of $SiO_2$, 0 to 5% by weight of $Al_2O_3$, 0 to 10% by weight of MgO, 5 to 15% by weight of CaO, 10 to 18% by weight of $Na_2O$, 0 to 5% by weight of $K_2O$, 5 to 15% by weight in total of MgO and CaO, 10 to 20% by weight in total of $Na_2O$ and $K_2O$, and 0 to 5% by weight of $B_2O_3$; and, as coloring components 0.60 to 0.85% by weight, in terms of $Fe_2O_3$, of total iron oxide, 1.4 to 1.7% by weight of $CeO_2$, and 0 to 0.5% by weight of $TiO_2$, and satisfying the above equation (I).

7 Claims, No Drawings

ULTRAVIOLET AND INFRARED RADIATION ABSORBING GLASS

FIELD OF THE INVENTION

This invention relates to ultraviolet and infrared radiation absorbing (hereinafter sometimes referred to as "UV- and IR-absorbing") glass having a green tint.

BACKGROUND OF THE INVENTION

In order to meet the demand for the protection of the interior trim of automobiles against deterioration, which has been increasing with the recent trend to luxury of the interior trim, and to reduce the load of air conditioning, green-tinted glass endowed with ultraviolet (UV) and infrared (IR) absorbing power has recently been proposed as window glass of automobiles.

For example, green-tinted glass having a UV transmission of not more than about 38%, a total solar energy transmission of not more than about 46% and, for providing an outside view, a visible light transmission of at least 70% is known. There is a tendency that green-tinted glass having a bluish green tint is preferred for use in automobiles.

It is known that a reduction in total solar energy transmission can be achieved by increasing the amount of ferrous oxide (FeO). This approach has been taken in most conventional IR-absorbing glasses.

Various proposals have hitherto been made with respect to reduction of UV transmission. For example, the green-tinted UV- and IR-absorbing glass disclosed in JP-A-3-187946 (the term "JP-A" as used herein means an "unexamined published Japanese patent application") is characterized by containing cerium oxide and titanium oxide. In detail, the glass disclosed has a basic composition containing 65 to 75% by weight of $SiO_2$, 0 to 3% by weight of $Al_2O_3$, 1 to 5% by weight of MgO, 5 to 15% by weight of CaO, 10 to 15% of $Na_2O$, and 0 to 4% by weight of $K_2O$ and contains, as coloring components, 0.51 to 0.96% by weight of $Fe_2O_3$, a ratio of FeO based on the total iron oxide (hereinafter sometimes referred to as "$FeO/T-Fe_2O_3$", where $T-Fe_2O_3$ represents the total iron oxide in terms of $Fe_2O_3$) of 0.23 to 0.29, 0.2 to 1.4% by weight of $CeO_2$, and 0 to 0.85% by weight of $TiO_2$.

The green-tinted UV-absorbing glass disclosed in JP-A-6-56466 comprises a soda-lime-silica basic glass composition containing, as coloring components, 0.53 to 0.70% by weight, in terms of $Fe_2O_3$, of total iron oxide having an $FeO/T-Fe_2O_3$ ratio of 0.30 to 0.40, 0.5 to 0.8% by weight of $CeO_2$, and 0.2 to 0.4% by weight of $TiO_2$.

The green-tinted UV-absorbing glass disclosed in JP-A-6-191880 comprises a soda-lime-silica basic glass composition containing, as coloring components, 0.75% by weight or more, in terms of $Fe_2O_3$, of total iron oxide having an $FeO/T-Fe_2O_3$ ratio of 0.22 to 0.29 and 0.8 to 1.2% by weight of $CeO_2$.

Further, because cerium oxide is expensive, UV-absorbing glass having a reduced cerium oxide content has been proposed. For example, JP-A-4-231347 discloses green-tinted UV-absorbing glass comprising a soda-lime-silica basic glass composition and containing, as coloring components, more than 0.85% by weight, in terms of $Fe_2O_3$, of total iron oxide having an $FeO/T-Fe_2O_3$ ratio of 0.275 or smaller and less than 0.5% by weight of $CeO_2$.

The above-mentioned conventional UV- and IR-absorbing glass owes its UV absorbing characteristics to UV absorption by $Fe_2O_3$, $CeO_2$ and $TiO_2$ and interactions among them. Of these components, it is $CeO_2$ that can enhance the UV absorption best without giving a yellowish tint unfavorable as window glass for automobiles. However, because $CeO_2$ is expensive, the $CeO_s$ content has sometimes been minimized while compensating for the resulting reduced UV absorption by using $Fe_2O_3$ and $TiO_2$. However, the light absorbing action of $Fe_2O_3$ or the interaction between $TiO_2$ and FeO is not only exerted on the UV region but also extended over the visible light region. Therefore, addition of these coloring components in an attempt to enhance UV absorption is accompanied by a reduction in transmission in the shorter visible wavelength region of visible light, resulting in yellowing of the glass.

The present invention has been made in the light of the above-described problems associated with the conventional techniques.

SUMMARY OF THE INVENTION

An object of the invention is to provide UV- and IR-absorbing glass which has excellent UV- and IR absorbing power and is free from the yellowness of glass that is unfavorable for use in automobiles.

The above and other objects and effects of the present intention will be apparent from the following description.

The prevent invention in its first embodiment relates to UV- and IR-absorbing glass comprising, as basic glass components, 65 to 80% by weight of $SiO_2$,
0 to 5% by weight of $Al_2O_3$,
0 to 10% by weight of MgO,
5 to 15% by weight of CaO,
10 to 18% by weight of $Na_2O$,
0 to 5% by weight of $K_2O$,
5 to 15% by weight in total of MgO and CaO,
10 to 20% by weight in total of $Na_2O$ and $K_2O$, and
0 to 5% by weight of $B_2O_3$; and
as coloring components,
0.75 to 0.95% by weight, in terms of $Fe_2O_3$, of total iron oxide,
1.2 to 1.4% by weight of $CeO_2$, and
0 to 0.5% by weight of $TiO_2$,
and satisfying equation (I):

$$(0.2\times(CeO_2)-0.04) \leq (FeO/T-Fe_2O_3) \leq (0.2\times(CeO_2)+0.08) \quad (I)$$

wherein ($CeO_2$) represents the amount of $CeO_2$ in terms of percent by weight, and ($FeO/T-Fe_2O_3$) represents the weight ratio of FeO in terms of $Fe_2O_3$ to the total iron oxide in terms of $Fe_2O_3$.

The present invention in its second embodiment relates to UV- and IR-absorbing glass comprising, as basic glass components, 65 to 80% by weight of $SiO_2$,
0 to 5% by weight of $Al_2O_3$,
0 to 10% by weight of MgO,
5 to 15% by weight of CaO,
10 to 18% by weight of $Na_2O$,
0 to 5% by weight of $K_2O$,
5 to 15% by weight in total of MgO and CaO,
10 to 20% by weight in total of $Na_2O$ and $K_2O$, and
0 to 5% by weight of $B_2O_3$; and,
as coloring components,
0.60 to 0.85% by weight, in terms of $Fe_2O_3$, of total iron oxide, 1.4 to 1.7% by weight of $CeO_2$, and 0 to 0.5% by weight of $TiO_2$, and satisfying equation (I):

$$(0.2\times(CeO_2)-0.04)\leq(FeO/T-Fe_2O_3)\leq(0.2\times(CeO_2)+0.08) \quad (I)$$

wherein ($CeO_2$) represents the amount of $CeO_2$ in terms of percent by weight, and ($FeO/T-Fe_2O_3$) represents the weight ratio of FeO in terms of $Fe_2O_3$ to the total iron oxide in terms of $Fe_2O_3$.

DETAILED DESCRIPTION OF THE INVENTION

The UV- and IR-absorbing glass according to the first embodiment preferably comprises, as basic glass components, 65 to 80% by weight of $SiO_2$, 0 to 5% by weight of $Al_2O_3$, 0 to 10% by weight of MgO, 5 to 15% by weight of CaO, 10 to 18% by weight of $Na_2O$, 0 to 5% by weight of $K_2O$, 5 to 15% by weight in total of MgO and CaO, 10 to 20% by weight in total of $Na_2O$ and $K_2O$, and 0 to 5% by weight of $B_2O_3$; and, as coloring components, 0.75 to 0.95% by weight, in terms of $Fe_2O_3$, of total iron oxide having a ratio of FeO based on the total iron oxide of 0.25 to 0.29, 1.2 to 1.4% by weight of $CeO_2$, and 0 to 0.5% by weight of $TiO_2$.

The UV- and IR-absorbing glass according to the second embodiment preferably comprises, as basic glass components, 65 to 80% by weight of $SiO_2$, 0 to 5% by weight of $Al_2O_3$, 0 to 10% by weight of MgO, 5 to 15% by weight of CaO, 10 to 18% by weight of $Na_2O$, 0 to 5% by weight of $K_2O$, 5 to 15% by weight in total of MgO and CaO, 10 to 20% by weight in total of $Na_2O$ and $K_2O$, and 0 to 5% by weight of $B_2O_3$; and, as coloring components, 0.60 to 0.80% by weight, in terms of $Fe_2O_3$, of total iron oxide having a ratio of FeO based on the total iron oxide of 0.30 to 0.35, 1.4 to 1.7% by weight of $CeO_2$, and 0 to 0.5% by weight of $TiO_2$.

Further, the UV- and IR-absorbing glass according to the second embodiment preferably comprises, as basic glass components, 65 to 80% by weight of $SiO_2$, 0 to 5% by weight of $Al_2O_3$, 0 to 10% by weight of MgO, 5 to 15% by weight of CaO, 10 to 18% by weight of $Na_2O$, 0 to 5% by weight of $K_2O$, 5 to 15% by weight in total of MgO and CaO, 10 to 20% by weight in total of $Na_2O$ and $K_2O$, and 0 to 5% by weight of $B_2O_3$; and, as coloring components, 0.65 to 0.85% by weight, in terms of $Fe_2O_3$, of total iron oxide having a ratio of FeO based on the total iron oxide of 0.30 to 0.35, 1.4 to 1.6% by weight of $CeO_2$, and 0 to 0.5% by weight of $TiO_2$.

The UV- and IR-absorbing glass according to the first and second embodiments, when it has a thickness of 4 mm, preferably has a visible light transmission of 70% or more as measured in a wavelength region of 380 to 770 nm with the CIE standard illuminant A; a dominant wavelength of 495 to 520 nm and an excitation purity of 2.0 to 3.5% as measured in a wavelength region of 380 to 770 nm with the CIE standard illuminant C; a total solar energy transmission of less than 48% as measured in a wavelength region of 300 to 2,100 nm; and a total UV transmission of less than 30%, particularly less than 28%, as measured in a wavelength region of 300 to 400 nm.

The UV- and IR-absorbing glass according to the first and second embodiments, when it has a thickness of 4 mm, still more preferably has a UV transmission of less than 24% at a wavelength of 370 nm.

The grounds for limitations of the basic glass composition of the UV- and IR-absorbing glass according to the first and second embodiments are explained below. All the percents are given by weight.

$SiO_2$ is a main component forming the skeleton of glass. If its content is less than 65%, the glass has reduced durability. If it exceeds 80%, the composition is difficult to melt.

$Al_2O_3$ serves to improve durability of glass. If its content exceeds 5%, the composition is difficult to melt. A preferred $Al_2O_3$ content is from 0.1 to 2%.

MgO and CaO both serve to improve durability of glass and to control the liquidus temperature and viscosity at the time of glass forming. If the MgO content exceeds 10%, the liquidus temperature rises. If the CaO content is less than 5% or higher than 15%, the liquidus temperature rises. If the total content of MgO and CaO is less than 5%, the resulting glass has deteriorated durability. If it exceeds 15%, the liquidus temperature rises.

$Na_2O$ and $K_2O$ are used as glass melting accelerators. If the $Na_2O$ content is less than 10%, or if the total content of $Na_2O$ and $K_2O$ is less than 10%, the effect of melting acceleration is weak. If $Na_2O$ content exceeds 18%, or if the total content of $Na_2O$ and $K_2O$ exceeds 20%, durability is reduced. It is unfavorable that the $K_2O$ content exceeds 5% because it is more expensive than $Na_2O$.

While $B_2O_3$ can be a component generally used for improvement of durability of glass or as melting aid, it may also function to enhance UV absorption. If it exceeds 5.0%, exertion of the light transmission reducing effect would be extended over the visible region. It follows not only that the tint tends to be yellow-tinted but that volatilization of $B_2O_3$ on forming would cause troubles. Accordingly, the upper limit of the $B_2O_3$ content should be 5.0%. In one embodiment of the present invention including the first and second embodiments, the glass does not contain $B_2O_3$.

Iron oxide is present in the glass in the form of $Fe_2O_3$ and FeO. The former is a component serving to absorb UV together with $CeO_2$ and $TiO_2$, while the latter is a component serving to absorb IR.

In the first embodiment of the invention, the weight ratio of FeO in terms of $Fe_2O_3$ to the total iron oxide in terms of $Fe_2O_3$ (hereinafter sometimes referred to "$FeO/T-Fe_2O_3$ ratio") should satisfy equation (I):

$$(0.2\times(CeO_2)-0.04)\leq(FeO/T-Fe_2O_3)\leq(0.2\times(CeO_2)+0.08) \quad (I)$$

wherein ($CeO_2$) represents the amount of $CeO_2$ in terms of percent by weight, and ($FeO/T-Fe_2O_3$) represents the FeO/$T-Fe_2O_3$ ratio. In order to obtain a desired total solar energy absorption, the total iron oxide content should range from 0.75 to 0.95%. The $FeO/T-Fe_2O_3$ ratio is preferably in the range of from 0.25 to 0.29. With the total iron oxide content and the $FeO/T-Fe_2O_3$ ratio falling within the above specified respective ranges, the $CeO_2$ content for securing desired UV absorption power ranges from 1.2 to 1.4%. If the $CeO_2$ content is less than 1.2%, the UV absorbing effect is insufficient. If it exceeds 1.4%, the absorption in the shorter wavelength side of a visible light becomes noticeable to cause yellowness, that is, the glass will have a dominant wavelength exceeding 520 nm and become yellow-tinted to the degree unfavorable for use in automobiles, etc., resulting in the failure of obtaining a desired visible light transmission and a desired dominant wavelength. In order to substantially prevent the glass from being yellow-tinted and to obtain a further improved UV absorbing power, the $CeO_2$ content preferably ranges from 1.22 to 1.4%.

In the second embodiment of the invention, the $FeO/T-Fe_2O_3$ ratio should satisfy equation (I) described above. In order to obtain a desired total solar energy absorption, the total iron oxide content should range from 0.60 to 0.85%. The $FeO/T-Fe_2O_3$ ratio is preferably in the range of from 0.30 to 0.35. With the total iron oxide content and the $FeO/T-Fe_2O_3$ ratio falling within the above specified respective ranges, the $CeO_2$ content for securing desired UV absorption power ranges from 1.4 to 1.7%. If the $CeO_2$ content is less than 1.4%, the UV absorbing effect is insufficient. If it exceeds 1.7%, the absorption in the shorter wavelength side of the visible light becomes noticeable to cause yellowness, that is, the glass will have a dominant wavelength exceeding 520 nm and exhibit a yellow-tinted tone to a degree unfavorable for use in automobiles, etc., resulting in the failure of obtaining a desired visible light transmission and a desired dominant wavelength. In order to substantially prevent the glass from being yellow-tinted and to obtain further improved UV absorbing power, it is preferable that the total iron oxide content be 0.60 to 0.80% and the $CeO_2$ content be 1.5 to 1.7%.

Where the total iron oxide content is 0.65 to 0.85% for the purpose of substantially preventing the glass from being yellow-tinted and obtaining further improved UV absorbing power, the $CeO_2$ content is preferably 1.4 to 1.6%.

In both the first and second embodiments of the invention, $TiO_2$, while not essential, can be added in a small amount in order to enhance UV absorption. The upper limit of the $TiO_2$ content is 0.5%. If the $TiO_2$ content exceeds the upper limit, the glass tends to be yellow-tinted. If desired, the glass composition may further contain the following optional components in addition to the above-mentioned components as long as the green tint as aimed at is not impaired. That is, the glass may contain other coloring components, e.g., CoO, NiO, MnO, $V_2O_5$, $MoO_3$, etc., and $SnO_2$ as a reducing agent in a total amount of up to 1%. In particular, CoO gives a blue tint and is therefore effective to prevent the glass from being yellow-tinted due to $Fe_2O_3$, $CeO_2$ or $TiO_2$ added in increased amounts. A preferred amount of CoO to be added ranges from 3 to 20 ppm.

The UV- and IR-absorbing glass of the invention has a green tint and exhibits high UV absorption, high IR absorption, and high visible light transmission, especially high UV absorption.

The present invention will now be illustrated in greater detail by way of Examples below, but the present invention is not construed as being limited thereto.

EXAMPLES 1 TO 7

A typical soda-lime-silica glass batch was appropriately compounded with ferric oxide, titanium oxide, cerium oxide, and a carbonaceous material as a reducing agent, and the resulting batch was melted at 1,500° C. for 4 hours in an electric furnace. The molten glass was cast on a stainless steel plate and slowly cooled to room temperature to obtain a glass plate having a thickness of about 6 mm. The glass plate was polished to prepare a 4 mm thick glass sample for evaluating optical characteristics.

A visible light transmission (YA) measured with the CIE standard illuminant A, a total solar energy transmission (TG), a UV transmission (Tuv), and a dominant wavelength (Dw) and an excitation purity (Pe) measured with the CIE standard illuminant C were obtained. As an additional measure for UV transmission, a UV transmission at 370 nm (T370), at which the change in transmission sensitively appears in the course of the steep rise from the absorption end of the transmission curve, was measured.

In Table 1 below are shown the $T-Fe_2O_3$ concentration, $FeO/T-Fe_2O_3$ ratio, $TiO_2$ concentration, $CeO_2$ concentration, and optical characteristics of the samples.

TABLE 1

|  | $T-Fe_2O_3$ (wt %) | FeO/ $T-Fe_2O_3$ | $TiO_2$ (wt %) | $CeO_2$ (wt %) | YA (%) | TG (%) | Tuv (%) | T370 (%) | Dw (nm) | Pe (%) |
| --- | --- | --- | --- | --- | --- | --- | --- | --- | --- | --- |
| Example 1 | 0.85 | 0.27 | 0 | 1.30 | 70.9 | 43.5 | 27.1 | 21.1 | 506.8 | 2.90 |
| Example 2 | 0.95 | 0.25 | 0 | 1.22 | 70.5 | 43.6 | 27.8 | 20.9 | 508.5 | 2.85 |
| Example 3 | 0.85 | 0.28 | 0.20 | 1.20 | 70.7 | 42.5 | 26.8 | 20.7 | 515.4 | 2.18 |
| Example 4 | 0.85 | 0.29 | 0 | 1.40 | 71.0 | 42.3 | 26.4 | 23.3 | 507.3 | 2.93 |
| Example 5 | 0.95 | 0.25 | 0 | 1.40 | 70.5 | 42.4 | 24.9 | 22.9 | 513.2 | 2.68 |
| Example 6 | 0.76 | 0.30 | 0 | 1.20 | 71.4 | 42.7 | 28.9 | 29.1 | 500.6 | 3.46 |
| Example 7 | 0.75 | 0.33 | 0 | 1.35 | 71.5 | 42.7 | 28.4 | 27.9 | 502.2 | 3.39 |
| Example 8 | 0.75 | 0.32 | 0 | 1.50 | 71.1 | 43.6 | 26.2 | 20.6 | 509.3 | 2.72 |
| Example 9 | 0.75 | 0.32 | 0.15 | 1.40 | 70.8 | 42.7 | 25.8 | 20.3 | 512.4 | 2.81 |
| Example 10 | 0.70 | 0.35 | 0 | 1.60 | 71.5 | 43.7 | 26.5 | 21.5 | 507.0 | 2.47 |
| Example 11 | 0.85 | 0.30 | 0 | 1.40 | 70.3 | 42.3 | 26.9 | 20.9 | 509.2 | 2.78 |
| Example 12 | 0.81 | 0.30 | 0 | 1.70 | 71.1. | 42.5 | 25.6 | 21.8 | 506.4 | 2.95 |
| Example 13 | 0.70 | 0.35 | 0 | 1.70 | 71.7 | 42.7 | 27.5 | 23.8 | 506.8 | 2.93 |
| Example 14 | 0.65 | 0.38 | 0 | 1.50 | 71.9 | 43.0 | 28.9 | 27.0 | 498.6 | 3.46 |
| Example 15 | 0.65 | 0.39 | 0 | 1.65 | 72.0 | 43.0 | 28.4 | 25.6 | 501.4 | 3.25 |
| Comparative | 0.84 | 0.23 | 0.25 | 0.50 | 71.2 | 43.6 | 29.0 | 30.4 | 520.0 | 2.51 |

TABLE 1-continued

| | T-Fe$_2$O$_3$ (wt %) | FeO/ T-Fe$_2$O$_3$ | TiO$_2$ (wt %) | CeO$_2$ (wt %) | YA (%) | TG (%) | Tuv (%) | T370 (%) | Dw (nm) | Pe (%) |
|---|---|---|---|---|---|---|---|---|---|---|
| Example 1 Comparative Example 2 | 0.85 | 0.25 | 0 | 1.60 | 71.5 | 44.8 | 24.9 | 20.3 | 529.3 | 3.02 |
| Comparative Example 3 | 0.66 | 0.37 | 0 | 1.30 | 72.0 | 43.1 | 31.2 | 31.0 | 498.3 | 3.91 |
| Comparative Example 4 | 0.95 | 0.26 | 0 | 1.80 | 70.3 | 42.9 | 22.8 | 18.3 | 525.9 | 2.65 |
| Comparative Example 5 | 0.95 | 0.26 | 0 | 1.00 | 71.5 | 43.1 | 30.1 | 30.2 | 509.4 | 2.76 |

Examples 1 to 7 are within the scope of the first embodiment of the invention. As is apparent from Table 1, all the samples of Examples 1 to 7 having a thickness of 4 mm have a visible light transmittion (YA) of 70% or more as measured with the illuminant A, a dominant wavelength (Dw) of 495 to 520 nm and an excitation purity (Pe) of 2.0 to 3.5% as measured with the illuminant C, a total solar energy transmission (TG) of less than 48%, and a UV transmission (Tuv) of less than 30%. Of Examples 1 to 7, Examples 1 to 5 relate to glass compositions according to a preferred mode of the first embodiment of the invention, in which the glass has a total UV transmission (Tuv) of less than 28% and a UV transmission at 370 nm (T370) of less than 24%, proving more excellent in UV absorption than the glass of Examples 6 and 7. Accordingly, an excellent deterioration preventive effect is expected on interior trim particularly when the glass of Examples 1 to 5 is used as window glass of vehicles, such as automobiles, or buildings. In particular, when the CeO$_2$ content is 1.22% or higher, the dominant wavelength (Dw) is 510 nm or shorter. It is seen from this fact that the dominant wavelength (Dw) is appreciably reduced, i.e., yellowness can be suppressed, by slightly increasing the CeO$_2$ content from 1.20% to 1.22%.

EXAMPLES 8 TO 15

In the same manner as in Examples 1 to 7, a typical soda-lime-silica glass batch was appropriately compounded with ferric oxide, titanium oxide, cerium oxide, and a carboneous material as a reducing agent, and the resulting batch was melted at 1,500° C. for 4 hours in an electric furnace. The molten glass was cast on a stainless steel plate and slowly cooled to reoom temperature to obtain a glass plate having a thickness of about 6 mm. The glass plate was polished to prepare a 4 mm thick glass sample for evaluating optical characteristics.

A visible light transmission (YA) measured with the CIE standard illuminant A, a total solar energy transmission (TG), a UV transmission (Tuv), and a dominant wavelength (Dw) and an excitation purity (Pe) measured with the CIE standard illuminant C were obtained. As an additional measure for UV transmission, a UV transmission at 370 nm (T370), at which the change in transmission sensitively appears in the course of the steep rise from the absorption end of the transmission curve, was measured.

The T–Fe$_2$O$_3$ concentration, FeO/T–Fe$_2$O$_3$ ratio, TiO$_2$ concentration, CeO$_2$ concentration, and optical characteristics of the samples are shown in Table 1 below.

Examples 8 to 15 are within the scope of the second embodiment of the invention. As is apparent from Table 1, all the samples of Examples 8 to 15 having a thickness of 4 mm have a visible light transmission (YA) of 70% or more as measured with the illuminant A, a dominant wavelength (Dw) of 495 to 520 nm and an excitation purity (Pe) of 2.0 to 3.5% as measured with the illuminant C, a total solar energy transmission (TG) of less than 48%, and a UV transmission (Tuv) of less than 30%. Of Examples 8 to 15, Examples 8 to 13 relate to glass compositions according to a preferred mode of the second embodiment of the invention, in which the glass has a total UV transmission (Tuv) of less than 28% and a UV transmission at 370 nm (T370) of less than 24%, proving more excellent in UV absorption than the glass of Examples 14 and 15. Accordingly, an excellent deterioration preventive effect is expected on interior trim particularly when the glass of Examples 8 to 13 is used as window glass of vehicles, such as automobiles, or buildings.

COMPARATIVE EXAMPLES 1 TO 5

In Table 1 are also shown Comparative Examples. The glass samples of Comparative Examples 1 to 5 have a composition out of the scope of the present invention. The composition of Comparative Example 1 is the same as one of those described in Examples of JP-A-3-187946.

While the samples of Comparative Examples 2 and 4 exhibit equal or even higher UV absorption as compared with the samples of Examples, their dominant wavelength (Dw) with the illuminant C is far longer than that of the glass whose composition fall within the range of the invention (i.e., 495 to 520 nm), indicating yellowness of the tint.

The samples of Comparative Examples 1, 3 and 5 have a UV transmission (Tuv) exceeding 28% and a transmission at 370 nm (T370) exceeding 24%, proving inferior in UV absorption to the glass of Examples.

As has been fully described, the present invention makes it possible to produce UV- and IR-absorbing glass having excellent UV- and IR-absorption without yellowing the tint.

Further, because the UV- and IR-absorbing glass of the invention has a bluish green tint while exhibiting high UV absorbing power, it is highly effective in prevention of interior trim or decoration, and the like from deterioration or browning when applied as glass panes of automobiles or buildings.

While the invention has been described in detail and with reference to specific examples thereof, it will be apparent to one skilled in the art that various changes and modifications can be made therein without departing from the spirit and scope thereof.

What is claimed is:

1. Ultraviolet and infrared radiation absorbing glass comprising, as basic glass components, 65 to 80% by weight of SiO$_2$,
  0 to 5% by weight of Al$_2$O$_3$,
  0 to 10% by weight of MgO, 5 to 15% by weight of CaO, 10 to 18% by weight of $Na_2O$, 0 to 5% by weight of $K_2O$, 5 to 15% by weight in total of MgO and CaO, 10 to 20% by weight in total of $Na_2O$ and $K_2O$, and 0 to 5% by weight of $B_2O_3$; and, as coloring components, 0.60 0.80% by weight, in terms of $Fe_2O_3$, of total iron oxide having a ratio of FeO based on the total iron oxide of 0.30 to 0.35, 1.4 to 1.7% by weight of $CeO_2$, and 0 to 0.15% by weight of $TiO_2$ and wherein said glass has a dominant wavelength of 495 to 520 nm as measured with the CIE standard illuminant C when said glass has a thickness of 4 mm and an ultraviolet transmission of less than 30% when said glass has a thickness of 4 mm.

2. Ultraviolet and infrared radiation absorbing glass as claimed in claim 1, wherein said glass has a visible light transmission of 70% or more as measured with the CIE standard illuminant A, when said glass has a thickness of 4 mm.

3. Ultraviolet and infrared radiation absorbing glass as claimed in claim 1, wherein said glass has a solar radiation transmission of less than 48%, when said glass has a thickness of 4 mm.

4. Ultraviolet and infrared radiation absorbing glass as claimed in claim 1, wherein said glass has an excitation purity of 2.0 to 3.5% as measured with the CIE standard illuminant C, when said glass has a thickness of 4 mm.

5. Ultraviolet and infrared radiation absorbing glass as claimed in claim 1, wherein said glass has an ultraviolet transmission of less than 24% at a wavelength of 370 nm, when said glass has a thickness of 4 mm.

6. Ultraviolet and infrared radiation absorbing glass as claimed in claim 1, comprising as coloring components 0.65 to 0.80% by weight, in terms of $Fe_2O_3$, of total iron oxide having a ratio of FeO based on the total iron oxide of 0.30 to 0.35, and 1.4 to 1.6% by weight of $CeO_2$.

7. Ultraviolet and infrared radiation absorbing glass as claimed in any one of claim 3, 4 or 5, wherein said glass does not contain $B_2O_3$.

* * * * *